United States Patent [19]
Tobita

[11] Patent Number: 5,506,827
[45] Date of Patent: Apr. 9, 1996

[54] DIGITAL DATA REPRODUCING APPARATUS

[75] Inventor: Minoru Tobita, Tokyo, Japan

[73] Assignee: Sony Corporation, Tokyo, Japan

[21] Appl. No.: 240,336

[22] Filed: May 10, 1994

[30] Foreign Application Priority Data

May 11, 1993 [JP] Japan .................................. 5-133976

[51] Int. Cl.⁶ .............................. G11B 7/00; H04L 27/01
[52] U.S. Cl. .............................. 369/59; 369/47; 369/124;
            360/51; 360/65; 375/229; 375/290
[58] Field of Search .................................. 369/59, 60, 54,
            369/58, 47, 48, 49, 50, 32, 124; 360/51,
            65, 39, 40, 45; 375/18, 11, 12, 14

[56] References Cited

U.S. PATENT DOCUMENTS 5,166,955  11/1992  Ohta ...................................... 360/65 X
5,255,128  10/1993  Inoue et al. ............................. 360/40
5,265,125  11/1993  Ohta ...................................... 360/65 X Primary Examiner—Georgia Y. Epps
Assistant Examiner—Muhammad Edun
Attorney, Agent, or Firm—Limbach & Limbach; Philip M. Shaw, Jr.

[57] ABSTRACT

An optical reproducing apparatus, for example, an optical magnetic disc device for reproducing data, has been recorded on a disc recording medium by applying the Viterbi decoding method, or the like, and can effectively avoid the deterioration of bit error rate even if the DC level fluctuates. When Viterbi decoding the reproducing signal by converting it into digital values, if a transition pattern in which the signal level of the reproducing signal transits across the center level is detected, the center level is corrected.

4 Claims, 5 Drawing Sheets

DIGITAL DATA REPRODUCING APPARATUS

BACKGROUND OF THE INVENTION

1. Field of the Invention

This invention relates to a digital data reproducing apparatus, and more particularly to an improvement of a digital data reproducing apparatus for reproducing digital data by means of partial response.

2. Description of the Related Art

In an optical magnetic disc device or the like, when recording data in digital, a partial response class 1 is often applied because optical disc apparatuses having an optical magnetic device can reproduce DC signals.

In the above apparatuses, the data recorded by means of the partial response system is reproduced. The reproduced signal is then decoded with reference to a specified threshold level.

In the optical disc, the DC level fluctuates due to double refraction on the disc surface, or the like. Further, in recording and reproducing, if the conditions of laser power etc., are different, the level of the reproducing signal fluctuates, and as a result, the suitable threshold level changes.

SUMMARY OF THE INVENTION

An object of this invention is to provide a digital data reproducing apparatus which is capable of solving the problems described above.

The foregoing object and other objects of this invention have been achieved by the provision of a digital data reproducing apparatus, comprising: reproducing means for reproducing digital data recorded on a recording medium by means of a partial response class 1, and generating a reproducing signal corresponding to the digital data signal from said recording medium; analog-to-digital converting means for converting said reproduced signal into a digital value in a predetermined period; average detecting means for obtaining the average between the maximum value and minimum value of said the reproducing signal, which is obtained based on the reproducing signal from reference data recorded on said recording medium; and Viterbi decoding means comprising: a transition pattern detecting means for setting said average to the center level, and detecting the transition pattern of said digital value based on said center level; decoding means for decoding said digital data signal from said digital value corresponding to the detected result of said transition pattern detecting means; and center level update means for updating said center level based on said digital value in the case where a transition pattern varying said digital value across said center level certainly, is detected.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
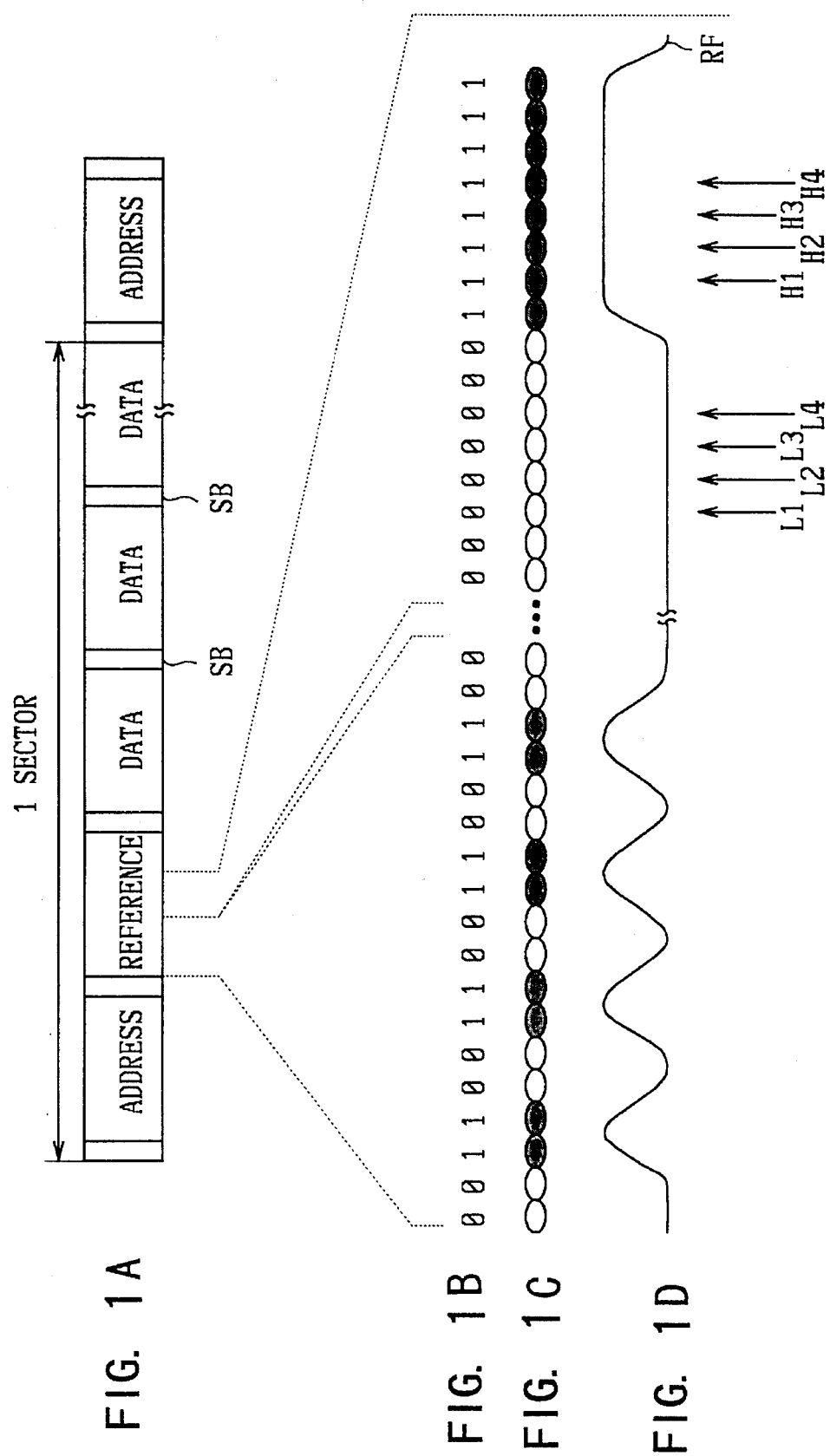
FIGS. 1A to 1D are schematic diagrams explaining recording patterns of the optical magnetic disc.

Preferred embodiments of this invention will be described with reference to the accompanying drawings In this invention, an optical magnetic disc shown in FIGS. 1A to 1D is applied. In the optical magnetic disc, an information recording surface is divided into sector units, and each sector unit is divided into a plurality of segments (FIG. 1A). Further, at the head of each segment, a servo area SB is formed so as to control tracking through its reproduction.

In the optical magnetic disc, address data of each sector is previously recorded to an address area in the optical magnetic disc. Phase adjusting data and level detecting data are recorded to the succeeding reference area.

Here, the phase adjusting data is formed by data that are continuations of successive logic "0"s and logic "1"s of 2 bits each (FIGS. 1B and 1C). The optical magnetic disc apparatus corrects phase shifting of the clocks with reference to the phase adjusting data (FIG. 1D).

On the other hand, the level detecting data is formed by successive data of the logic "0"s and the logic "1"s succeeding for predetermined bits. The reference level for data demodulation is set based on the reproduced result of the level detecting data.

Here, the optical magnetic disc apparatus of this invention applies a Viterbi decoding method.

Here, the level detecting data of reproducing signal RF can be sampled based on the reproduced result of the phase adjusting data, thereby, signal levels L1 to L4, and H1 to H4 of the reproducing signal RF can also be detected.

Further, based on the detected result of the signal levels L1 to L4, and H1 to H4, the optical magnetic disc apparatus executes operation processing on the basis of the following equations:

$$AVLOW = (L1+L2+L3+L4)/4 \quad (1)$$

$$AVHIGH = (H1+H2+H3+H_4)/4 \quad (2)$$

$$S = (AVHIGH - AVLOW)/2 \quad (3)$$

$$CEN = (AVHIGH + AVLOW)/2 \quad (4)$$

$$Yk = (RFk - CEN) \quad (5)$$

The equation yield the L level AVLOW of the reproducing signal RF, the H level AVHIGH of the reproducing signal RF, the average amplitude S of the reproducing signal RF, the center level CEN of the reproducing signal RF, and the amplitude value Yk of the reproducing signal RF in which the center level is set to the 0 level. The reproducing signal RF is demodulated relative to the L level AVLOW, H level AVHIGH, average amplitude S, center level CEN of the reproducing signal RF, and amplitude value Yk of the reproducing signal RF.

Note that, in the equation (5), "RFK" denotes the amplitude value of the reproducing signal RF.

Figure 2:
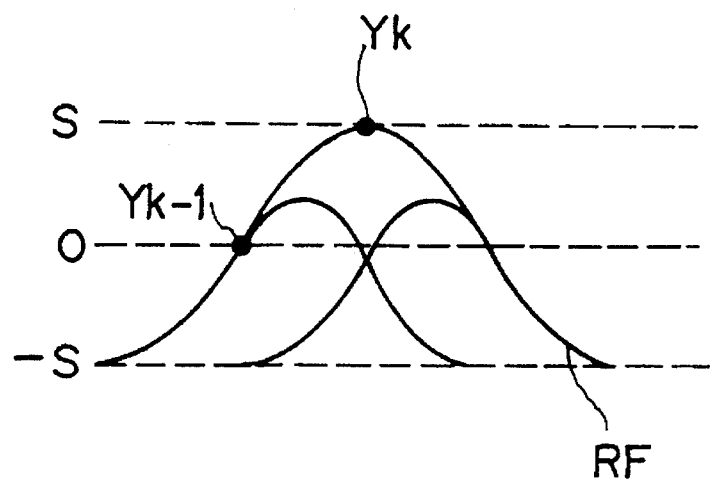
FIG. 2 is a schematic diagram illustrating the eye pattern of the reproducing signal.

Here, when applying the partial response class 1, as shown in FIG. 2, if the center value of the amplitude of the reproducing signal RF is set to the center level CEN, the reproducing signal RF will fluctuate from —S to 0 or from 0 to S sinusoidally depending on continuation or discontinuation of the data of the logic "1" or logic "0".

A Viterbi decoding circuit subtracts the center level CEN from the signal level of the reproducing signal RF obtained sequentially, in order to obtain the reproducing results of respective data as amplitude values Yk–1, Yk, . . . , from the center level CEN, and then judges the transition of the data in accordance with the change of the amplitude values Yk–1, Yk, . . . .

Further, the Viterbi decoding circuit temporarily sets the logic level of demodulating data to correspond to the transition result, and further tracks the transition judging result to correct the demodulating data set temporarily.

In the judgment of data transition, the Viterbi decoding circuit judges which of the following relational expressions is satisfied to judge the state of transition of the successive data:

$$S/2+Bk-1<Yk+Yp-1 \quad (6)$$

$$-S/2+Bk-1<Yk+Yp-1<S/2+Bk-1 \quad (7)$$

$$-S/2+Bk-1>Yk+Yp-1 \quad (8)$$

If any of the equations (6) to (8) is satisfied, the Viterbi decoding circuit generates demodulating data Dn rendered by the following equations:

$$Dn=POL(Yk-S/2) \quad (9)$$

$$Dn=POL-(Yp-1-Bk-1) \quad (10)$$

$$Dn=POL(Yk+S/2) \quad (11)$$

Figures 3A, 3B, 3C:
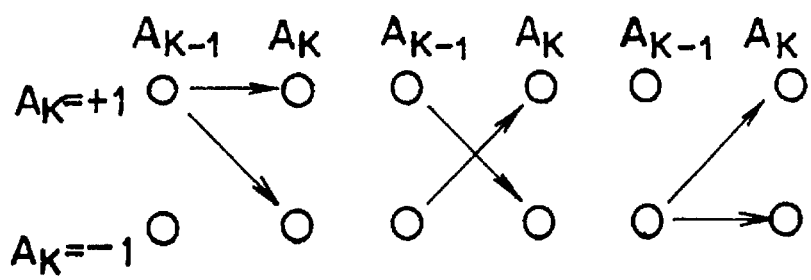
FIGS. 3A to 3C are schematic diagrams showing transition patterns.

That is, as shown in FIGS. 3A to 3C, when satisfying the equation (6), the data to be demodulated is judged ti be the first transition pattern transiting from the level of +1 to the level of +1 or −1, (FIG. 3A), and when satisfying the equation (7), the data is judged to be the second transition pattern transiting from the level of +1 to −1, or from the level of −1 to +1, that is, across the 0 level (FIG. 3B), and when satisfying the equation (8), the data is judged to be is the third transition pattern transiting from the level of −1 to the level of +1 or −1 (FIG. 3C).

Here, if it is the first or third transition pattern, the data preceding 1 bit can be judged to be the logic "1" and or "0" respectively. As a result, the demodulating result of the succeeding data can be judged in accordance with the first and second transition patterns with respect to succeeding data.

Note that, "POL" denotes the polarity of the operation result. If any of the relational expressions (6) to (8) is satisfied, "Yp" and "Bk" are respectively rendered by the following equations:

$$Yp=Yk, Bk=S/2 \quad (12)$$

$$Yp=-Yp-1, Bk=-Bk-1 \quad (13)$$

$$Yp=Yk, Bk=-S/2 \quad (14)$$

In this manner, the Viterbi decoding circuit detects the transition of the reproducing signal RF to obtain the decoding result by executing the operation processing of the equations (6) to (8). The Viterbi decoding circuit then updates the reference values Yp and Bk that are decoding references of the succeeding data which are based on the decoding result. Yp and Bk are therefore updated in sector units.

In the optical magnetic disc apparatus, there is a case where the DC level of the reproducing signal RF varies due to double refraction of a light beam on the optical magnetic disc or the like.

If the DC level varies in the Viterbi decoding circuit, the amplitude value Yk of the reproduced signal RF cannot be detected correctly, and deterioration of the bit error rate of the decoding output occurs.

To solve such a problem, a method of cramping the reproducing signal RF is considered by utilizing a servo pattern SB formed from every segment. However, this method has a fault: within the segments fluctuation of the DC level cannot be avoided.

This invention further provides an optical magnetic disc apparatus in which effects due to fluctuation of the DC level of the reproducing signal RF in one segment, also can be avoided.

Figure 4:
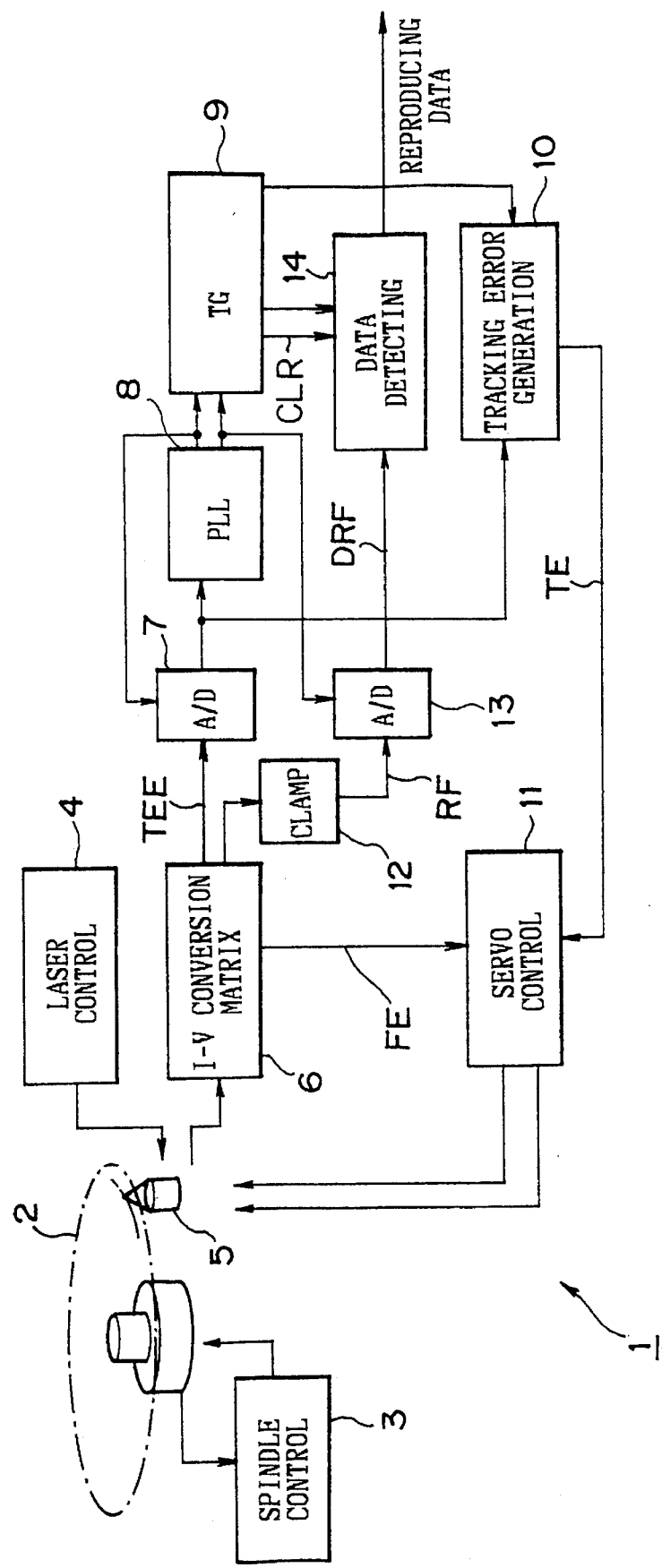
FIG. 4 is a block diagram showing the optical magnetic disc apparatus according to an embodiment of this invention.
Figure 5:
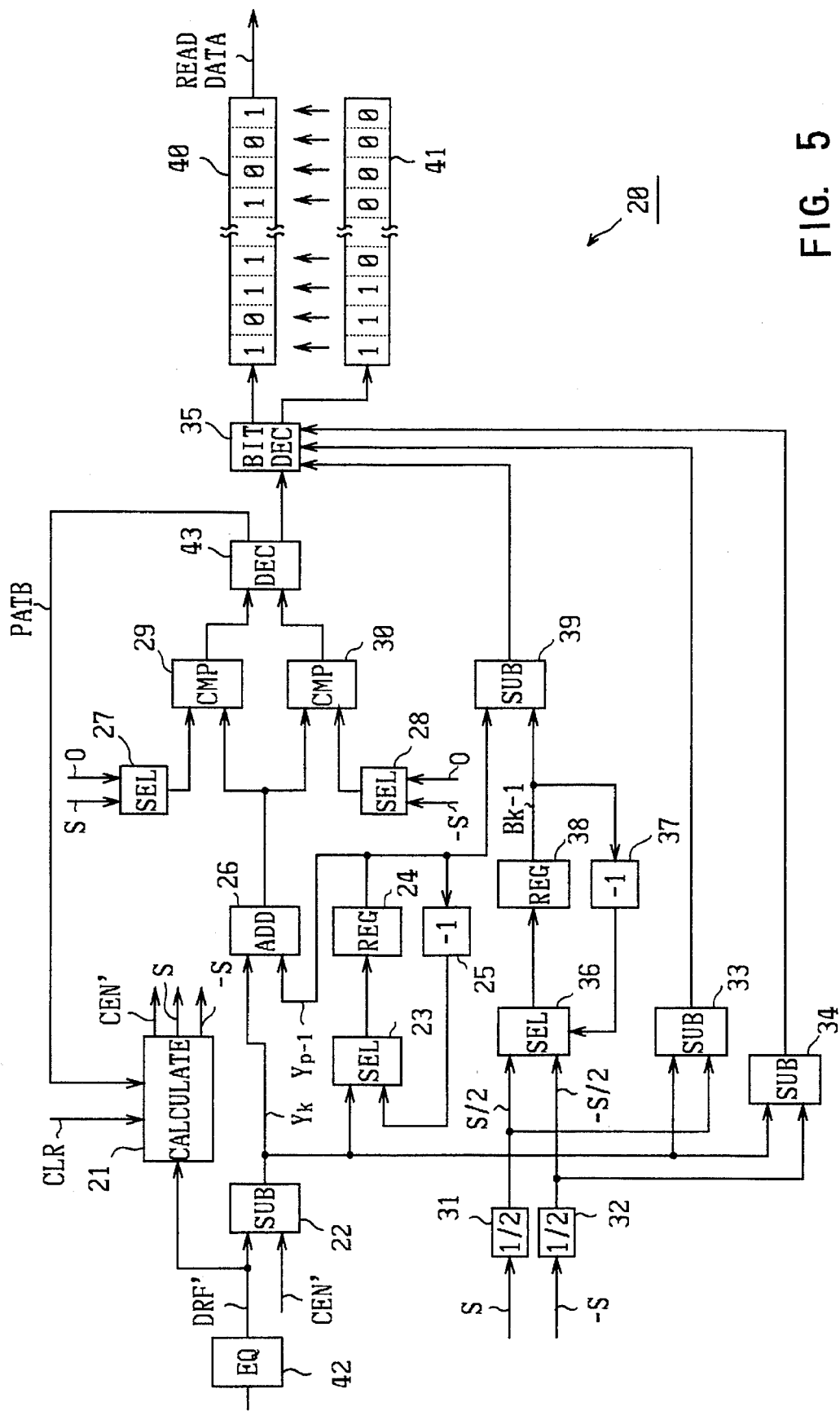
FIG. 5 is a block diagram showing the Viterbi decoding circuit.
Figure 6:
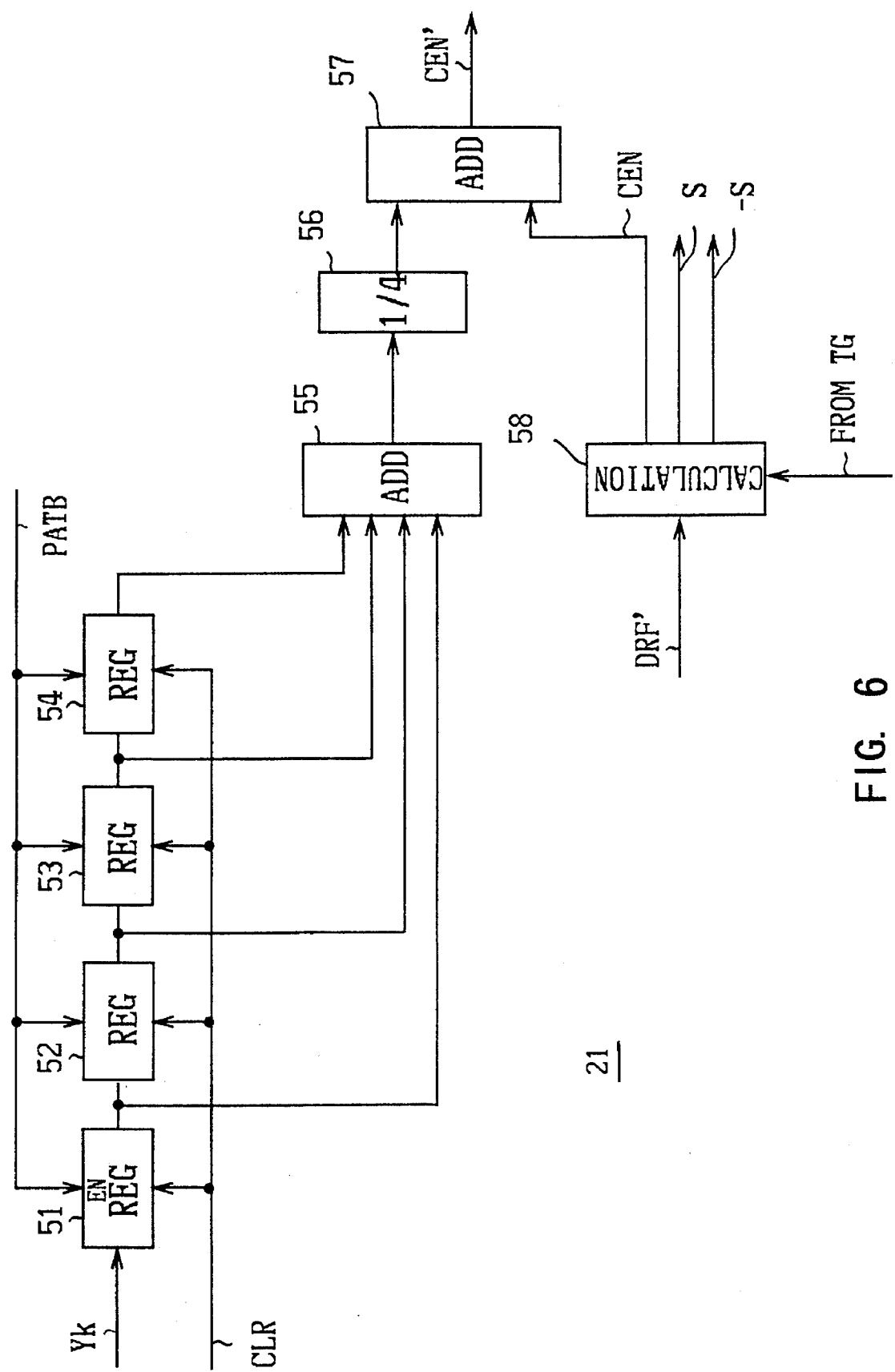
FIG. 6 is a block diagram showing the calculation circuit.

Here, the details of this invention will be described with accompanying. FIGS. 4 to 6.

FIG. 4, 1 generally shows an optical magnetic disc apparatus.

In optical magnetic disc 2, a magnetized membrane is formed on a disc substrate. Further, on the optical magnetic disc 2, the information recording surface is divided into sectors and segments. At the head of each segment, a servo area SB has been recorded as a sample format through preformatting. At the head of the segment of each sector, address data is recorded, and at the second segment, phase adjusting data and level detecting data are recorded.

A spindle motor is driven by a spindle control circuit 3 to rotary-drive the optical magnetic disc 2 at a constant angular velocity (CAV).

In the optical magnetic disc apparatus 1, the motion of the laser diode contained in an optical pickup 5 is controlled by a laser control circuit 4, so that the optical pickup 5 is driven to irradiate the optical magnetic disc 2 with a light beam. Further, in data recording, desired data are thermomagnetically-recorded to the data area succeeding to an area formed reference area, and then the reflected light obtained by irradiating the light beam in reproducing, is received by a light receiving element arranged at the optical pickup 5.

A current to voltage I/V conversion matrix circuit 6 converts the output signal of the light receiving element, and then performs specified adding and subtracting processes to generate reproducing signal RF, sum signal TEE for tracking error signal generation, and focus error signal FE.

Of these signals, only the sum signal TEE for tracking error signal generation is converted by the analog-to digital circuit 7 into a digital signal. A PLL circuit 8 generates a clock signal based on the digital signal, and supplies this clock signal to the analog-to-digital converting circuit 7.

A timing generator 9 generates respective timing signals. The timing generator 9 is the base of the various motions with respect to the output signal of the PLL circuit 8.

A tracking error generation circuit 10 inputs the signal corresponding to the servo pattern in the output signal of the analog-to-digital converting circuit 7, so as to generate the tracking error signal TE.

Thereby, a focus coil and a tracking coil arranged at the optical pickup 5 are driven, by a servo control circuit 11 with reference to the tracking error signal TE and focus error signal FE, in order to focus-control and tracking-control.

A clamp circuit 12 clamps the reproducing signal RF at a specified signal level. Based on the reproducing result of the servo pattern, the analog-to-digital converting circuit 13 converts the clamped signal into a digital signal in a pit forming period. A data detecting circuit 14 demodulates this digital signal through Viterbi decoding.

The data detecting circuit 14 with accompanying FIG. 5 will now be described.

An equalizer 42 equalizes the wave forms of the output data DRF from the analog-to-digital converting circuit 13, and supplies output data DRF' to a calculation circuit 21. The calculation circuit 21 selects the data from the reference area in the output data DRF', and executes the equations (1) to (5) in order to detect the center level CEN' and the average amplitudes S and —S.

Note that, the center level CEN' is supplied to a subtracter 22. Further, the average amplitude S is supplied to a selector 27 and a divider 31, and the average amplitude —S is supplied to a selector 28 and a divider 32.

Further, the output data DRF' of the equalizer 42 is supplied to the subtracter 22. The subtracter 22 subtracts the center level CEN' from the output data DRF', so that the amplitude value Yk of the reproducing signal RF is detected when the center level CEN' is set to the 0 level.

A selector 23 selectively outputs either the output data of the amplitude value Yk of the reproducing signal RF output from the subtracter 22, or the output data of an inverse circuit 25, based on the decoding output of the data of the preceding bit which is detected by a pattern decoder 43.

A register 24 holds the output data of the selector 23. An inverse circuit 25 inverts the sign of the output data of the selector 23, and then the Viterbi decoding circuit 20 switches the connecting point of the selector 23 based on the decoding output of the pattern decoder 43, and then executes equations (12) to (14) to generate a reference value Yp−1 which is described above with reference to the equations (6) and (7).

An adder 26 adds the reference value Yp−1 and the amplitude value Yk to detect the value Yk+ Yp−1 in the equations (6) to (8). The connecting points of selectors 27 and 28 are switched respectively based on the decoding output of the preceding bit detected by the pattern decoder 43, in order to selectively output the data of the value 0 or S, and the value —S or 0. Thereby, a reference value Bk−1 is set based on the decoding output of the preceding bit, and the values S/2+Bk−1 and —S/2+Bk−1 of the equations (6) to (8) are set.

A comparator circuit 29 detects whether or not the relational expression of the equation (6) is satisfied by comparing the output data of the selector 27 and the output data of the adder 26. A comparator circuit 30 detects whether or not the relational expression of the equation (8) is satisfied by comparing the output data of the selector 28 and the output data of the adder 26.

The pattern decoder 43 judges whether or not any of the relational expressions of the equations (6) to (8) is satisfied in 1 bit units, based on the comparison results of the comparator circuits 29 and 30, so as to set the reference values Yp and Bk based on the decoding result.

Dividers 31 and 32 output the amplitude values S and −S detected by the calculation circuit 21, divided respectively by two. Subtracters 33 and 34 subtract the respective output data S/2 and —S/2 of the dividers 31 and 32 from the output data Yk of the subtracter 22, and then output only the most significant bit of each subtracting result, i.e., the data showing the polarity.

That is, the subtracters 33 and 34 execute the equations (9) and (11) respectively, and then output the operation processing result to a bit decoder 35.

The selector 36 selectively outputs the output data of the inverse circuit 37 or the output data S/2 and —S/2 of the dividers 31 and 32, based on the decoding output of the preceding bit detected by the pattern decoder 43 to a register 38. The register 38 holds and outputs the selected output data, i.e., the reference value Bk−1.

The inverse circuit 37 inputs the output data of the register 38, inverts the signs, and then outputs the data with the inverted signs.

The subtracter 39 subtracts the output data Bk−1 of the register 38 from the output data Yp−1 of the register 24, and outputs the most significant bit of the subtracting output. That is, the subtracter 39 executes the operation shown by the equation (10), and then supplies the operation processing output to the bit decoder 35.

The bit decoder 35 selectively supplies one of the output data of the subtracters 33, 34, and 39, based on the decoding output of the pattern decoder 43, to a register 40.

The register 40 is formed by a shift register of 20 bits. The register 40 temporarily holds the decoding results of 20 bits, and then sequentially outputs them.

Further, the Viterbi decoding circuit 20 has a shift register 41 of 20 bits which is parallel to the register 40. When the decoding result is outputted to the register 40, if the data supplied to the shift register 40 is detected with respect to the second transition pattern, the bit decoder 35 then stores the data showing the second transition pattern. In the bit decoder 35, if the output signal of the subtracter 39 is selected, the data of "1" is supplied to the shift register 41. If the output signal of the subtracter 33 or 34 is selected, the data of "0" is supplied to the shift register 41.

At this time, the Viterbi decoding circuit 20 judges whether or not the decoding data of the register 40 corresponding to the second transition pattern has been decoded correctly, based on the detecting results of the first and third transition patterns detected by the pattern decoder 43. If a negative result is obtained, the logic level of the data which has not been correctly decoded with reference to the flag of the shift resistor 41, is corrected so as to decode the correct data based on the transition detecting result.

That is, as shown in FIG. 5, if the data of "1" that are continuations of 3 bits is input to the input side of the shift register 41, it shows that the second transition pattern has been selected successively three times by the bit decoder 35. Further, if the third transition pattern is next selected, the bit decoder 35 detects the bit of the input terminal of the shift register 40. Here, the data is "1". However, since the succeeding transition pattern is the third transition pattern, the preceding data must be "0". In this manner, it is judged that the value set by the second transition pattern is wrong, and then the bit of the shift register 40 corresponding to the shift register 41 of the bit "1" is inverted, so that all of the bits of the shift register 41 of "1" are changed to "0".

Further, if the second transition pattern in which the level is varying from +1 to −1, or −1 to +1, i.e., across the 0 level, is detected, the pattern decoder 43 supplies signal PATB to the calculation circuit 21.

Here, a concrete example of the calculation circuit 21 will be described with accompanying FIG. 6. In FIG. 6, 51 to 54 are registers, which sequentially hold the amplitude value Yk whenever the signal PATB is supplied to the enabling terminal. When the amplitude value Yk has been supplied to all the registers 51 to 54, an adder 55 adds the amplitude value Yk held by respective registers 51 to 54. Further, a divider 56 divides the output signal of the adder 55 into 4 in order to obtain the average value of the amplitude value Yk.

A calculation circuit 58 receives the output signal DRF' from the equalizer 42. The calculation circuit 58 detects the center level CEN, amplitude values S and —S from the signal DRF'. This center level CEN is supplied to an adder 57 to add to the average value of the amplitude value Yk. Thereby, the center level value CEN is updated to the CEN'.

That is, in the pattern decoder 43, if the second transition pattern is detected, it can be judged with certainty that the signal level of the reproduced signal RF has varied across the center level CEN.

On the contrary, in the first and third transition patterns, it cannot be determined with certainty that the signal level of the reproduced signal has varied across the center level CEN.

Therefore, if the second transition pattern is detected, the center level CEN can be updated. Moreover the center level CEN in the same sector can be updated by tracking the fluctuation of the DC level. Therefore, even if the DC level fluctuates, the deterioration of the bit error rate can be avoided effectively.

Further, by updating the center level CEN according to the average value, the setting error of the center level CEN due to noise, can be avoided effectively. Likewise, the deterioration of the bit error rate of the optical magnetic disc apparatus 1 as a whole can be effectively avoided.

According to this invention, if the second transition pattern in which the signal level of the reproducing signal transits across the center level is detected, the center level is updated by averaging the signal level of the reproducing signal. Thereby, even if the DC level of the reproducing signal fluctuates, the reproducing signal can be decoded correctly. Thus the deterioration of the bit error rate can be avoided effectively.

Further, in the above embodiment, this invention is applied to an optical magnetic disc apparatus of the sample format. However, this invention is not limited to the sample formed, but may be applied to an optical magnetic disc apparatus of continuous servo.

Further, in the above embodiments, this invention is applied to an optical magnetic disc apparatus detecting the transition of the reproducing signal in three transition patterns. However, this invention may also be widely applied to various digital data reproducing apparatuses for reproducing data recorded by means of a partial response class 1.

While preferred embodiments of the invention have been described it will be obvious to those skilled in the art that there may be various changes and modifications possible. Therefore, the appended claims will cover all such changes and modifications that may fall within the true spirit and scope of the invention.

What is claimed is:

1. A digital data reproducing apparatus for reproducing a digital data signal recorded on a recording medium by means of a partial response class 1, said digital data reproducing apparatus comprising:

reproducing means for generating a reproducing signal corresponding to the digital data signal from said recording medium;

analog-to-digital converting means for converting said reproducing signal into a digital value at a predetermined period; and Viterbi decoding means, comprising:

average detecting means for obtaining an average value between a maximum value and a minimum value, which are obtained based on a reproducing signal from reference data recorded on said recording medium;

transition pattern detecting means for setting said average value to a center level, and detecting a transition pattern of said digital value with reference to said center level;

decoding means for decoding said digital data signal from said digital value on the basis of a detecting result of said transition pattern detecting means; and center level update means for updating said center level on the basis of said digital value when the transition pattern in which said digital value varies across said center level is detected.

2. The digital data reproducing apparatus according to claim 1, wherein:

said center level update means comprises:

memory means for storing a predetermined number of values which are related to said digital values when the transition pattern varying across said center level is detected; and average value detecting means for setting a new center level on the basis of an average value between a plurality of values stored in said memory means.

3. An optical reproducing apparatus for reproducing a digital data signal recorded on a disc recording medium by means of a partial response class 1, said optical reproducing apparatus comprising:

optical pickup means for emitting a laser beam to said disc recording medium and receiving a reflected laser beam from said disc recording medium to generate a reproducing signal;

analog-to-digital converting means for convening said reproducing signal into a digital value at a predetermined period; and Viterbi decoding means, comprising:

average detecting means for obtaining art average value between a maximum value and a minimum value, which are obtained based on a reproducing signal from reference data recorded on said recording medium;

transition pattern detecting means for setting said average value to a center level, and detecting a transition pattern of said digital value with reference to said center level;

decoding means for decoding a digital data signal from said digital value on the basis of a detecting result of said transition pattern detecting means; and center level update means for updating said center level on the basis of said digital value when the transition pattern in which said digital value varies across said center level is detected.

4. The digital data reproducing apparatus according to claim 3, wherein:

said center level update means comprises:

memory means for storing a predetermined number of values which are related to said digital values when the transition pattern in which said digital value varies across said center level is detected: and average value detecting means for setting a new center level on the basis of an average value between a plurality of values stored in said memory means.

\* \* \* \* \*